US012718831B2

(12) United States Patent
Li et al.

(10) Patent No.: US 12,718,831 B2
(45) Date of Patent: Aug. 25, 2026

(54) AUDIO ENHANCEMENT METHOD AND APPARATUS, AND COMPUTER STORAGE MEDIUM

(71) Applicant: Orka Health Co., Ltd., Shanghai (CN)

(72) Inventors: Linkai Li, Shanghai (CN); Congxi Lu, Shanghai (CN); Hongcheng Sun, Shanghai (CN)

(73) Assignee: Orka Health Co., Ltd., Shanghai (CN)

( * ) Notice: Subject to any disclaimer, the term of this patent is extended or adjusted under 35 U.S.C. 154(b) by 135 days.

(21) Appl. No.: 18/843,273

(22) PCT Filed: Mar. 2, 2023

(86) PCT No.: PCT/CN2023/079312

§ 371 (c)(1),
(2) Date: Sep. 2, 2024

(87) PCT Pub. No.: WO2023/165565

PCT Pub. Date: Sep. 7, 2023

(65) Prior Publication Data

US 2025/0182772 A1 Jun. 5, 2025

(30) Foreign Application Priority Data

Mar. 2, 2022 (CN) ......................... 202210199889.5

(51) Int. Cl.
*G10L 21/0208* (2013.01)
*H04R 3/00* (2006.01)

(52) U.S. Cl.
CPC .......... *G10L 21/0208* (2013.01); *H04R 3/005* (2013.01)

(58) Field of Classification Search
CPC ....... G10L 21/0208; G10L 2021/02166; G10L 21/0216; G10L 19/26; G10L 21/0264;
(Continued)

(56) References Cited

U.S. PATENT DOCUMENTS

| | | | |
|---|---|---|---|
| 6,449,586 | B1 | 9/2002 | Hoshuyama |
| 2004/0161121 | A1 | 8/2004 | Chol et al. |

(Continued)

FOREIGN PATENT DOCUMENTS

| | | | |
|---|---|---|---|
| CN | 101903948 | A | 12/2010 |
| CN | 106653043 | A | 5/2017 |

(Continued)

OTHER PUBLICATIONS

International Search Report of PCT/CN2023/079312 mailed on May 26, 2023 and its English translation.

(Continued)

*Primary Examiner* — Tung T Vo
(74) *Attorney, Agent, or Firm* — Junhe Law Office P.C.; Zhaohui Wang

(57) ABSTRACT

Disclosed in the present application are an audio enhancement method and apparatus, and a computer storage medium. The method comprises: generating a group of audio collection signals by means of a microphone array; performing delay-and-sum processing on the group of audio collection signals, so as to generate a delay-and-sum signal; performing blocking matrix processing on the group of audio collection signals, so as to generate a blocking matrix signal; using an adaptive filtering matrix to filter the blocking matrix signal, and removing the filtered blocking matrix signal from the delay-and-sum signal, so as to obtain an enhanced audio output signal. The adaptive filtering matrix is based on at least one attenuation function, and each of the at least one attenuation function is updated at an interval of a corresponding predetermined update interval T.

16 Claims, 9 Drawing Sheets

(58) Field of Classification Search
CPC .. H04R 3/005; H04R 25/405; H04R 2225/43; H04R 2430/23; H04R 2430/25; H04R 1/406; H04R 25/407; H04R 25/43
USPC .......................................................... 704/201
See application file for complete search history.

(56) References Cited

U.S. PATENT DOCUMENTS

| | | | | |
|---|---|---|---|---|
| 2005/0213432 | A1* | 9/2005 | Hoshuyama | H04R 3/005 367/129 |
| 2007/0273585 | A1* | 11/2007 | Sarroukh | G10K 11/341 342/379 |
| 2010/0171662 | A1 | 7/2010 | Sugiyama | |
| 2010/0189274 | A1* | 7/2010 | Thaden | G10L 21/02 381/66 |
| 2010/0246844 | A1* | 9/2010 | Wolff | G10L 21/02 381/66 |
| 2012/0076316 | A1* | 3/2012 | Zhu | G01S 3/801 381/71.11 |
| 2012/0099732 | A1 | 4/2012 | Visser | |
| 2019/0035382 | A1* | 1/2019 | Christoph | H04R 1/406 |
| 2019/0348056 | A1* | 11/2019 | Christoph | H04R 3/005 |
| 2021/0233509 | A1* | 7/2021 | Lashkari | H04S 7/301 |
| 2024/0414483 | A1* | 12/2024 | Pedersen | H04R 25/407 |
| 2025/0182772 | A1* | 6/2025 | Li | G10L 21/0208 |

FOREIGN PATENT DOCUMENTS

| | | | |
|---|---|---|---|
| CN | 107369456 | A | 11/2017 |
| CN | 109087663 | A | 12/2018 |
| CN | 109218912 | A | 1/2019 |
| CN | 109389991 | A | 2/2019 |
| CN | 110689900 | A | 1/2020 |
| CN | 110706719 | A | 1/2020 |
| CN | 110782913 | A | 2/2020 |
| CN | 110855269 | A | 2/2020 |
| CN | 113362846 | A | 9/2021 |
| CN | 114550734 | A | 5/2022 |
| JP | H1141687 | A | 2/1999 |

OTHER PUBLICATIONS

The Search Report for the counterpart Chinese patent application 202210199889.5, mailed on Mar. 21, 2025.
Yibo Z, Lei Y , Tao Y ,et al.A speech enhancement method with collaborative adaptive filtering and microphone array [J]. Modern Electronics Technique, 2019.
Rotaru M , S. Ciochinâ, Albu F .An efficient GSC VSS-APA beamformer with integrated log-energy based VAD for noise reduction in speech reinforcement systems[C]//ISSCS 2013—International Symposium on Signals, Circuits and Systems.IEEE, 2013.DOI:10.1109/ISSCS.2013.6651240.
Shanzhen W, Hui S , Jia L .First-order Differential Microphone Array Based on FLMS Adaptive Speech Enhancement Method[J]. Audio Engineering, 2010.
Jiang Q , Zhou Y , Liu H .A Robust GSC for Microphone Array Using Coherence and Signal-to-Interference Ratio[J]. 2019, 000(8979200).DOI:10.1109/ISSPIT47144.2019.9001775.

* cited by examiner

Low-frequency

High-frequency

AUDIO ENHANCEMENT METHOD AND APPARATUS, AND COMPUTER STORAGE MEDIUM

TECHNICAL FIELD

The present application relates to a beamforming technology, and more particularly, to an audio enhancement method and apparatus, and a computer storage medium.

BACKGROUND OF THE INVENTION

The beamforming algorithm is often used in audio devices such as headphones, hearing aids and speakers, and a basic principle of the beamforming algorithm is to pick up sounds through two or more microphones and calculate the times that the same sound takes to reach different microphones to determine a source of the sound. In a subsequent process, the algorithm can be used to retain or eliminate a sound coming from a certain direction. For example, a Bluetooth wireless headset with environmental noise reduction function may have two microphones placed up and down, such that a person's mouth is generally on a straight line connecting the two microphones. Picking up the wearer's speaking voice in this way can help eliminate the environmental noise, thereby improving the sound quality during calls. Currently, the hearing aids on the market are generally equipped with two microphones, which may be placed front and back, so that the beamforming algorithm can be used to extract the sound from the front (relative to the wearer's direction, and the same below) and eliminate the sound from the back, so that the wearer can focus on the front sound better during a conversation.

However, a typical beamforming algorithm can only retain the sound from a certain direction, but will reduce all the sounds from other directions. This is not suitable for application scenarios such as simulating a sound collection effect of the human ear through two or more microphones on a hearing aid. Therefore, it is necessary to provide an improved beamforming algorithm.

SUMMARY OF THE INVENTION

An objective of the present application is to provide an audio enhancement method and apparatus, and a computer storage medium to solve the problem of over-suppression of sound in non-target directions by a beamforming algorithm.

In an aspect of the present application, an audio enhancement method is provided, the method including: generating a group of audio collection signals using a microphone array, wherein each audio collection signal in the group of audio collection signals is generated by one microphone in the microphone array, and each microphone in the microphone array is spaced apart from others; performing a delay-and-sum processing on the group of audio collection signals to generate a delay-and-sum signal $Y_{DSB}(k,l)$, wherein k represents a frequency bin and l represents a frame index; performing a blocking-matrix processing on the group of audio collection signals to generate a blocking-matrix signal $Y_{BM}(k,l)$; performing a filtering processing on the blocking-matrix signal $Y_{BM}(k,l)$ using an adaptive filtering matrix WANG, and removing the filtered blocking-matrix signal from the delay-and-sum signal $Y_{DSB}(k,l)$ to obtain an enhanced audio output signal $Y_{OUT}(k,l)$; wherein the adaptive filtering matrix $W_{ANC}$ is a weight coefficient matrix which is based on at least one attenuation function μ(t) and varies with the audio output signal $Y_{OUT}(k,l)$ and the blocking-matrix signal $Y_{BM}(k,l)$, and each of the at least one attenuation function is updated at a corresponding predetermined update interval T.

In some embodiments, optionally, the microphone array comprises at least two microphones located on a same audio processing device.

In some embodiments, optionally, the audio processing device is adapted for being worn in a human auricle.

In some embodiments, optionally, one of the at least two microphones is oriented toward the auricle, and another of the at least two microphones is oriented away from the auricle.

In some embodiments, optionally, the audio output signal is determined by the following equation: $Y_{OUT}(k,l)=Y_{DSB}(k,l)-W_{ANC}^*(k,l)Y_{BM}(k,l)$; and the adaptive filtering matrix $W_{ANC}$ is determined by the following equation:

$$W_{ANC}(k, l+1) = W_{ANC}(k, l) + \mu(t) * \frac{Y_{BM}(k, l)Y_{GSC}^*(k, l)}{P_{est}(k, l)};$$

wherein $P_{est}(k,l)$ is determined by the following equation:

$$P_{est}(k, l) = \alpha P_{est}(k, l-1) + (1-\alpha)\sum\nolimits_{m=1}^{M-1}\left|Y_{BM_m}(k, l)\right|^2;$$

where a is a forgetting factor, and M is a number of the microphones in the microphone array.

In some embodiments, optionally, the at least one attenuation function comprises a first attenuation function and a second attenuation function, the first attenuation function is updated at a first predetermined update interval, and the second attenuation function is updated at a second predetermined update interval; wherein the first attenuation function corresponds to a high-frequency signal higher than or equal to a predetermined frequency threshold, and the second attenuation function corresponds to a low-frequency signal lower than the predetermined frequency threshold, and the first predetermined update interval is shorter than the second predetermined update interval.

In some embodiments, optionally, each of the at least one attenuation function μ(t) is updated in a current update interval based on its value in a first update interval.

In some embodiments, optionally, each point of each of the at least one attenuation function μ(t) in the current update interval μ(t) is updated by assigning a change weight between 0 and 1 based on a value of its corresponding point in the first update interval.

In some embodiments, optionally, the weight is a linear function of time within the current update interval.

In some embodiments, optionally, the weight is an increasing linear function of time within the current update interval.

In some embodiments, optionally, the weight is a nonlinear function of time within the current update interval.

In some embodiments, optionally, each of the at least one attenuation functions μ(t) is updated in the current update interval further based on its value at the end of a previous update interval.

In some embodiments, optionally, each of the at least one attenuation function μ(t) satisfies the following equation within the current update interval $$(NT, (N+1)T]: \mu(t) = \mu(N*T) + \left(\frac{t}{T} - N\right) * \mu(t - N*T),$$
$$N*T < t \leq (N+1)*T;$$

wherein N is a positive integer.

In another aspect of the present application, an audio enhancement apparatus is provided, the audio enhancement apparatus including a non-transitory computer storage medium having stored therein one or more executable instructions that, when executed by a processor, perform any one of the audio enhancement methods described above.

In some embodiments, optionally, the audio enhancement apparatus is a hearing aid.

In another aspect of the present application, an audio enhancement apparatus is provided, the audio enhancement apparatus including a non-transitory computer storage medium having stored therein one or more executable instructions that, when executed by a processor, perform any one of the audio enhancement methods described above.

The above is an overview of the present application, and there may be simplifications, generalizations, and omissions of details, so those skilled in the art should recognize that this section is illustrative only and is not intended to limit the scope of the present application in any way. This summary is neither intended to determine key features or necessary features of the claimed subject matter, nor intended to be used as an aid means in determining the scope of the claimed subject matter.

BRIEF DESCRIPTION OF DRAWINGS

The foregoing and other features of the content of the present application will be more fully and clearly understood from the following specification and appended claims, taken in conjunction with the accompanying drawings. It can be understood that these accompanying drawings only depict some implementations of the content of the present application, and therefore should not be considered as limits to the scope of the content of the present application. By using the accompanying drawings, the content of the present application will be explained more clearly and in detail.

Before explaining any embodiment of the present invention in detail, it should be understood that the application of the present invention is not limited to the details of configurations and the arrangement of elements set forth in the following description or shown in the following drawings. The present invention may have other embodiments and can be practiced or implemented in various ways. Moreover, it should be understood that the wordings and terms used herein are for descriptive purposes and should not be considered as limiting.

DETAILED DESCRIPTION OF THE INVENTION

In the following detailed description, reference is made to the accompanying drawings which form a part hereof. In the accompanying drawings, similar symbols typically identify similar components, unless otherwise stated in the context. The illustrative embodiments described in the detailed description, accompanying drawings, and claims are not intended to be limiting. Other embodiments may be utilized, and other changes may be made, without departing from the spirit or scope of the subject matter of the present application. It can be understood that the aspects of the content of the present application, as generally described in the present application and illustrated in the accompanying drawings, can be configured, substituted, combined, and designed in a wide variety of different configurations, all of which explicitly form part of the content of the present application.

Figure 1:
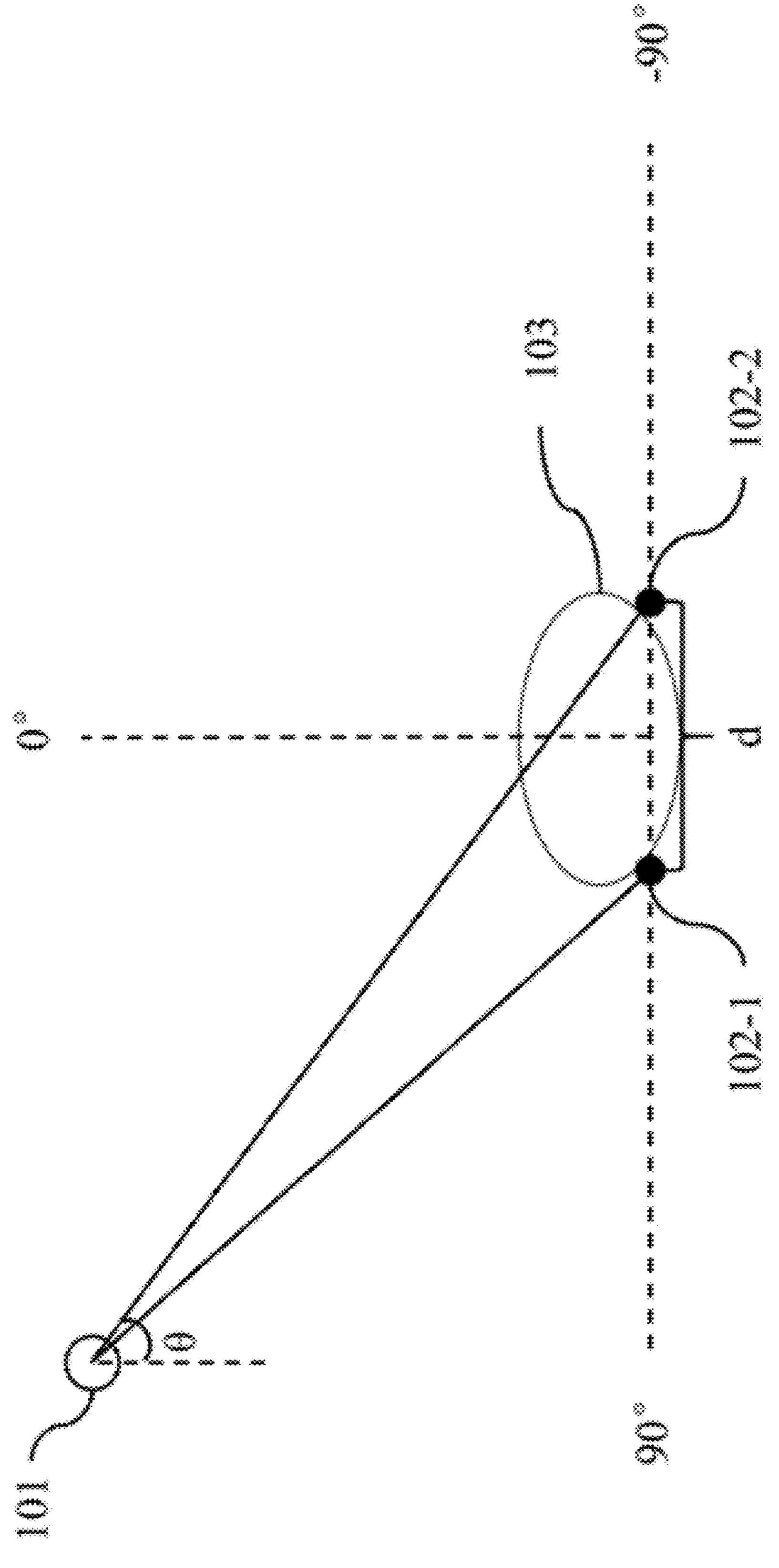
FIG. 1 illustrates a schematic diagram of a beamforming algorithm according to an example.
Figure 2:
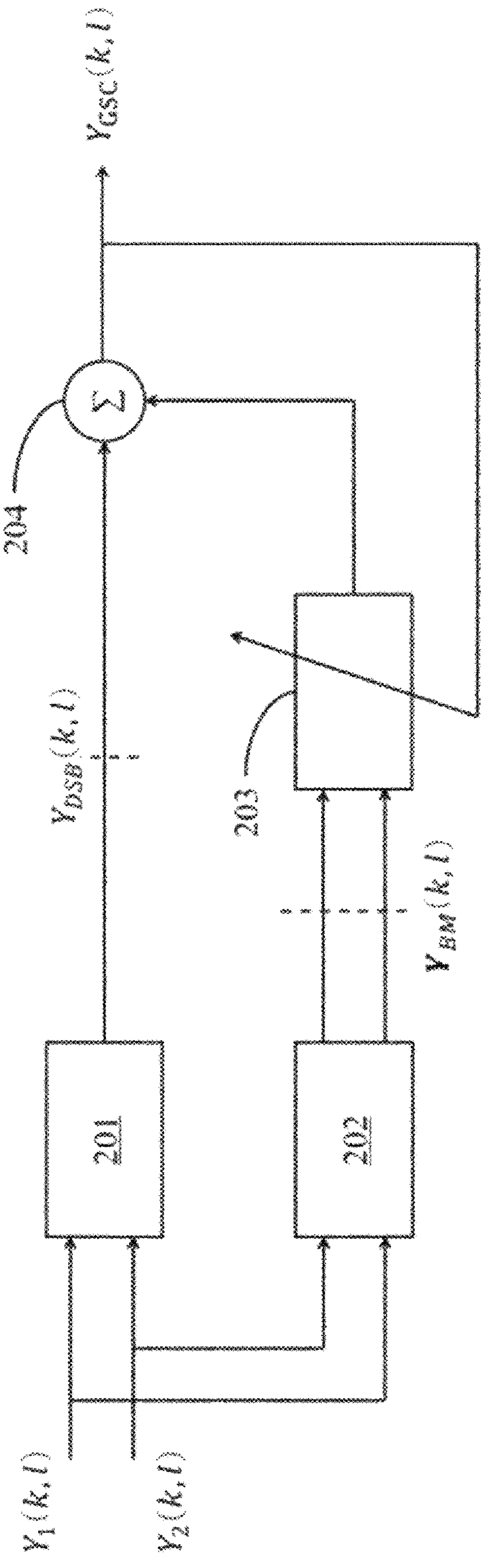
FIG. 2 illustrates a schematic diagram of a beamforming algorithm according to an example.

FIG. 1 and FIG. 2 illustrate a beamforming algorithm according to some examples. As shown in FIG. 1, a sound generated by a sound source 101 may be picked up by, for examples, a microphone 102-1 and a microphone 102-2 of a hearing aid. The microphone 102-1 and the microphone 102-2 may be disposed on left and right sides of a wearer 103 of the hearing aid (e.g., disposed in auricles of both sides), and a distance between them may be a constant value d. For example, the distance d may depend on a distance between two ears of the wearer 103. The wearer 103 faces the top in FIG. 1 (i.e., the front of the wearer) at an angle of 0° as shown. The sound source 101 is located in the left front of the wearer 103, and forms an angle θ with a midline of the wearer's 103 visual field. Since a distance between the sound source 101 and the wearer 103 (and his/her two ears) is much greater than the distance between the two ears, it can be considered that the sound source 101 is approximately at the angle θ shown in the figure relative to the microphone 102-1 and the microphone 102-2. It can be seen from the geometric relationship that, assuming that a propagation speed of sound in the air is v and a signal received by the microphone 102-1 is $y_1(t)$, a signal received by the microphone 102-2 is $y_2(t)=y_1(t-\tau)$, wherein $\tau=(d*\sin(\theta))/v$.

A short-time Fourier transforms is performed on the sound signals received by the microphone 102-1 and microphone 102-2 respectively. Assuming that a transformation result of $y_1(t)$ is $Y_1(k,l)$ and a transformation result of $y_2(t)$ is $Y_2(k,l)$, where k represents a frequency bin, and l represents a frame index, then $Y_1(k,l)$ and $Y_2(k,l)$ satisfy the following equation: $Y_2(k,l)=Y_1(k,l)*e^{-j\omega\tau}$.

Turning to FIG. 2, a delay beamformer 201 and a blocking-matrix 202 receive and process the signals from the microphone 102-1 and the microphone 102-2, respectively. In some embodiments, the signal $Y_{DSB}$ obtained after processing of the delay beamformer 201 may satisfy, for example, $$Y_{DSB} = \frac{1}{2}\left(Y_1(k, l) + Y_2(k, l)e^{j\omega\tau}\right),$$

and the signal $Y_{BM}$ obtained after processing of the blocking-matrix 202 may satisfy, for example, $Y_{BM}=Y_1(k,l)-Y_2(k,l)e^{j\omega\tau}$. A least mean square adaptive filter (LMS filter) 203 with adjustable parameters further processes $Y_{BM}$ and sends the processed result to a summing unit 204, and the signal $Y_{GSC}(k,l)$ output from the summing unit 204 satisfies $Y_{GSC}(k,l)=Y_{DSB}(k,l)-W_{ANC}{}^*(k,l)Y_{BM}(k,l)$, wherein $W_{ANC}(k,l)$ is an iteration coefficient of the LMS filter 203, and * represents conjugation.

Furthermore, $W_{ANC}(k,l)$ satisfies the following equations:

$$W_{ANC}(k, l+1) = W_{ANC}(k, l) + \mu * \frac{Y_{BM}(k, l)Y_{GSC}^*(k, l)}{P_{est}(k, l)} \tag{1}$$

$$P_{est}(k, l) = \alpha P_{est}(k, l-1) + (1-\alpha)\left(|Y_{BM}(k, l)|^2 + |Y_{GSC}(k, l)|^2\right) \tag{2}$$

If the hearing aid includes M microphones for collecting sound signals, the equation (2) can be expressed as:

$$P_{est}(k, l) = \alpha P_{est}(k, l-1) + (1-\alpha)\sum_{m=1}^{M-1}|Y_{BM_m}(k, l)|^2 \tag{2'}$$

In the above equations (2) and (2'), $\alpha$ is a forgetting factor. It can be understood that the introduction of the forgetting factor $\alpha$ can emphasize an amount of information provided by new data and gradually reduce influence of earlier data to prevent data saturation.

However, as mentioned above, the beamforming algorithm described above can only retain the sound of a certain preset direction, and will reduce all the sounds from other directions. For example, returning to FIG. 1, if the preset retention direction is 90°, this algorithm will almost completely retain the sound in the 90° direction, but almost completely eliminate the signal in the 0° direction, and the sounds between the 0° direction and the 90° direction will also be attenuated depending on the angles. For application scenarios such as using two or more microphones on a hearing aid to simulate a sound collection effect of the human ear, this signal processing method that only retains sound in one direction may not be ideal. In real life, the auricle of the human ear has an effect of assisting sound collection, making people collect sounds from the front better than from the back and have different effects on sounds of different frequencies. Therefore, in order to achieve the effect of simulating the auricle of the human ear on a hearing aid, a beamforming method that can perform customized adjustments on sounds in different directions is needed. In addition, it is expected that this method can also perform targeted adjustments on sounds of different frequencies.

The present application provides an algorithm that can control attenuation degrees and/or control attenuation degrees of signals of different frequencies with low power consumption, so that applications based on the algorithm are more in conformity with auditory perception of the human ear.

Figure 3:
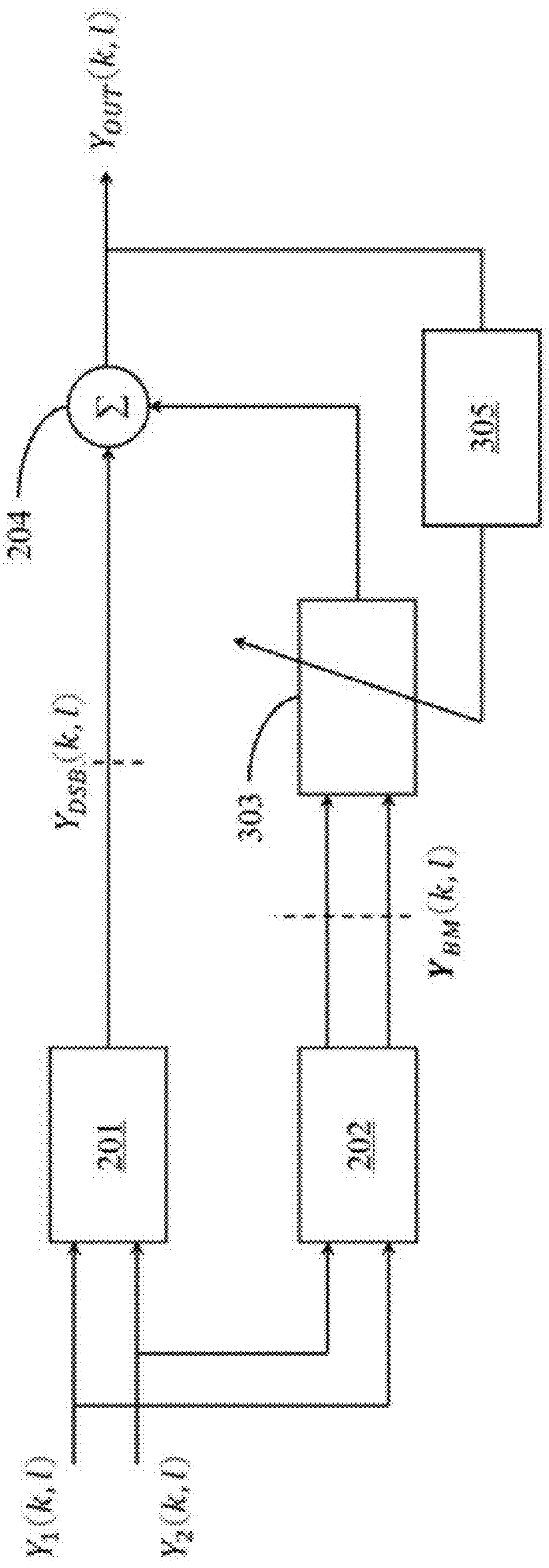
FIG. 3 illustrates a schematic diagram of a beamforming algorithm according to an embodiment of the present application.

FIG. 3 illustrates a schematic diagram of a beamforming algorithm according to an embodiment of the present application. Different from the scheme described above with reference to FIG. 1 and FIG. 2, a configuration scheme of an iterative coefficient of an LMS filter 303 in the beamforming algorithm will be changed according to some examples of the present application. While the coefficient $\mu$ is set as a constant value in the above equation (1), the coefficient $\mu$ is set as a function $\mu(t)$ that can change over time in the beamforming algorithm according to some examples of the present application, and in some examples, different functions $\mu_1(t)$, $\mu_2(t)$, . . . can be set for different frequencies (or frequency bands), where the setting of the coefficient will be described in detail below.

As shown in FIG. 3, compared with the solution shown in FIG. 2, a delay unit 305 is added in FIG. 3. The delay unit 305 can delay a series of coefficients U for a period of time (referred to as an update interval in the context of this application, denoted as T), and then use them to calculate the attenuation function $\mu(t)$ for the LMS filter 303, thereby implementing update of parameters of the LMS filter 303. As will be described below, the coefficients U may be values of the attenuation function $\mu(t)$ in a first update interval, and the delay unit 305 can delay and output this partial of coefficients U multiple times. This partial of coefficients U are also referred to as reduction coefficients U in the context of this application.

Figure 5:
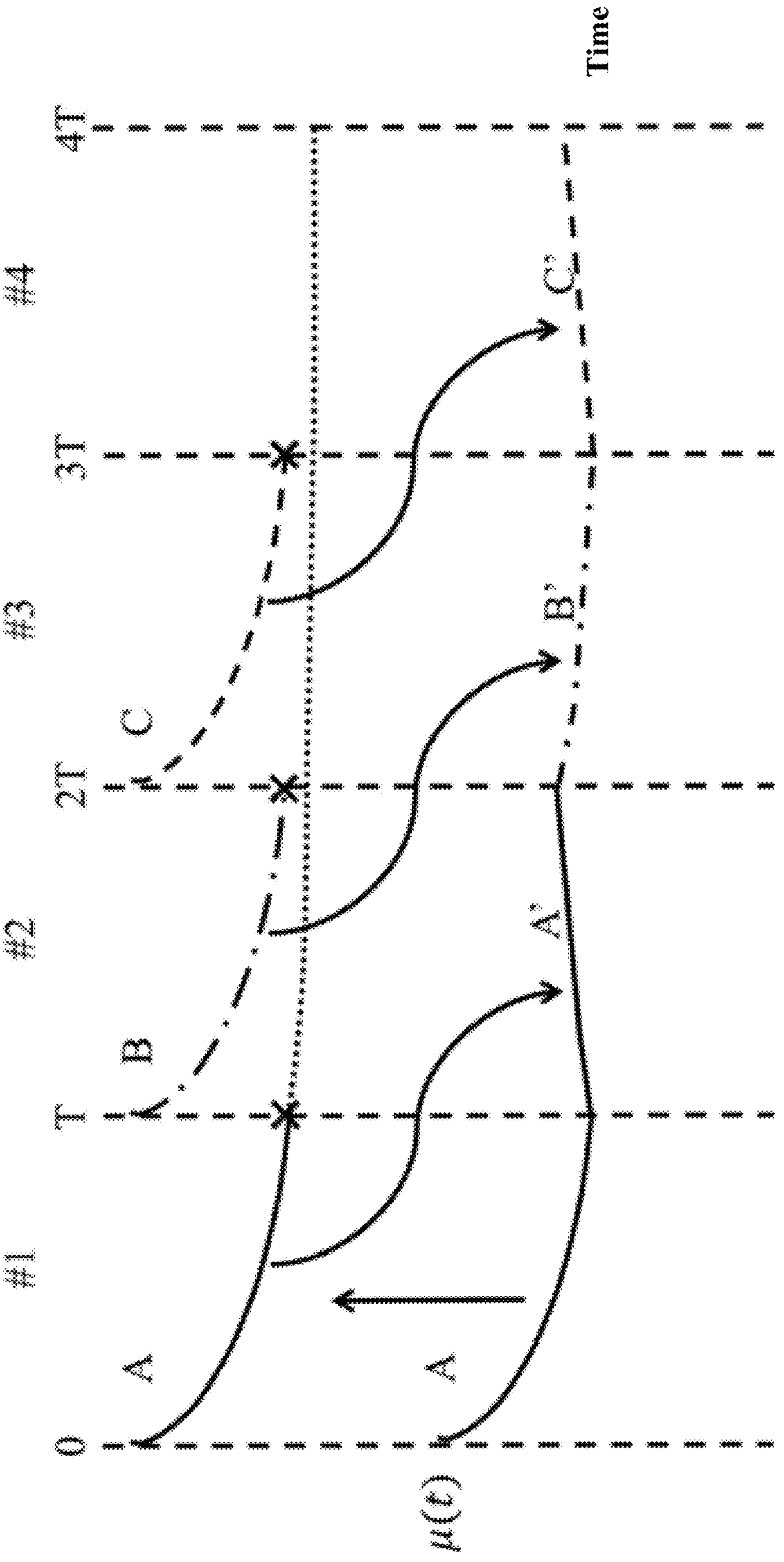
FIG. 5 illustrates a schematic diagram of a beamforming algorithm according to an embodiment of the present application.

According to some examples of the present application, after each update interval, the beamforming reduction coefficient U will be re-iterated to form a time-varying attenuation function $\mu(t)$. In this way, an attenuation intensity of the sound signal can be controlled to prevent excessive suppression of the sound in the non-target direction. FIG. 5 illustrates a schematic diagram of a beamforming algorithm according to an embodiment of the present application. As shown in FIG. 5, curves A, B and C represent the reduction coefficients U updated in time periods #1, #2 and #3, respectively. The curves A, B and C shown in FIG. 5 have the same shape, which means that the reduction coefficients U are the same in the time periods #1, #2 and #3. Specifically, the reduction coefficient U represented by the curve A shown is a starting part of the attenuation function $\mu(t)$, and may be continuously updated and copied by the delay unit 305 shown in FIG. 3 with an update interval T as a period, to obtain the curves B, C shown in the figure and subsequent curves (not shown). This update and copy process is equivalent to delaying and outputting the curve A multiple times.

On the other hand, in order to maintain the continuity of the audio attenuation function $\mu(t)$, this partial of updated reduction coefficient U will not be applied immediately, but will be gradually applied to the attenuation function $\mu(t)$ after a delay of an update interval T. As shown in FIG. 5, the last updated and copied attenuation coefficient U will be applied to the next update interval. Specifically, the updated curves A, B, and C generated in the time periods #1, #2, and #3 will be applied to time periods #2, #3, and #4, respectively, to form corresponding curves A', B', and C'. The curves A', B', and C' will serve as corresponding parts of the attenuation function $\mu(t)$.

Each point of the attenuation function $\mu(t)$ within the current update interval may be updated based on a value of a corresponding point in the attenuation coefficient U, and for example, the value of the corresponding point in the attenuation coefficient U can be assigned a weight between 0 and 1. In this way, the value of each point updated in the current update interval will be limited to a controllable range. It should be noted that in the context of the present application, each point in the current update interval and its corresponding point in the attenuation coefficient U are specified in a one-to-one correspondence in chronological order. In some examples, the assigned weights may be a linear function of time in the current update interval. In other examples, the assigned weight may also be a nonlinear function of time in the current update interval.

As described above, in some examples, the weights assigned in the attenuation function μ(t) may be a linear function of time, or a nonlinear function of time. For example, when the weights are a linear function of time (an increasing linear function), the attenuation function μ(t) of may be expressed by equation (3):

$$\mu(t)=\mu(N*T)+\left(\frac{t}{T}-N\right)*\mu(t-N*T),\ N*T<t\leq(N+1)*T \tag{3}$$

wherein N represents the number of updates closest to the current time point. For example, in the time period #3 (2T to 3T), the attenuation function μ(t) may be expressed by equation (4):

$$\mu(t)=\mu(2T)+\left(\frac{t}{T}-2\right)*\mu(t-2T),\ 2T<t\leq 3T \tag{4}$$

From the above equations (3) and (4), it can be seen that setting the weights as an increasing linear function of time can offset an "over-convergence" characteristic of μ(t−N*T) to a certain extent, thereby providing a compensation mechanism.

In some examples, the weights assigned in the attenuation function μ(t) may be a nonlinear function of time. For example, the attenuation function μ(t) of time may be expressed as:

$$\mu(t)=\mu(N*T)+\left(\frac{t}{T}-N\right)^2*\mu(t-N*T),\ N*T<t\leq(N+1)*T \tag{3'}$$

wherein N represents the number of updates closest to the current time point.

The above mathematical description of the attenuation function μ(t) will help to understand the generation mechanism of the attenuation function μ(t), but the generation method of the attenuation function μ(t) in the real world may be still assisted by the delay unit 305 shown in FIG. 3. It can be seen from the above equation (4) that, the values of μ(t) within the range (2T, 3T] is related to the values of μ(t) within (0,T] and the value μ(2T) of μ(t) at the end of the previous update interval. Therefore, the values of μ(t) within the range of (2T, 3T] (or the shape of the curve B') are related to the values of μ(t) within (0,T] (or the shape of the curve A). Since the curves A, B and C in FIG. 5 are updated in the time periods #1, #2 and #3 respectively, the shape of the curve B is consistent with the shape of the curve A, in other words, the shape of the curve B' is related to the shape of the curve B. The curve B is an updated copy of the curve A in the time period 2 #, such that the updated coefficients can be used to achieve the adjustment of the LMS filter 303 in time period 2T~3T. The above continuous copy and update of the curve in the update interval T will cause the attenuation function μ(t) to be generated and updated according to the update interval T, thereby avoiding the excessive suppression of the sound in the non-target direction caused by the over-convergence of the filter. On the other hand, since the values of μ(t) within the range (2T,3T] are related to the value μ(2T) of μ(t) at the end of the last update interval, there will be no sharp jumps of around the time 2T. The smoothing of μ(t) can protect, for example, hearing aid wearers from the trouble caused by unexpected fluctuations in volume.

As described above, the curves B and C are copies of the curve A, so at a start point of each predetermined update interval, the attenuation coefficients may have the same value (the values at the start points of the curves B and C). In some other examples, the curves B and C may also be fine-tuned with respect to the curve A, and in this case, the attenuation coefficients may have different values (the values at the start points of the curves B and C) at the start point of each predetermined update interval.

In addition, due to factors such as the human ear's auricle, the human ear may respond differently to sounds of different frequencies in different directions, so it is also expected that the beamforming algorithm can respond differently to sounds of different frequencies. In some examples of the present application, the above-mentioned response adjustment can be achieved by setting different update intervals for sound signals of different frequencies. For example, attenuation degrees of a low-frequency sound and a high-frequency sound can be separately controlled by setting different update intervals for the low-frequency sound and the high-frequency sound, thereby simulating the frequency response of the human ear's auricle.

Figure 6:
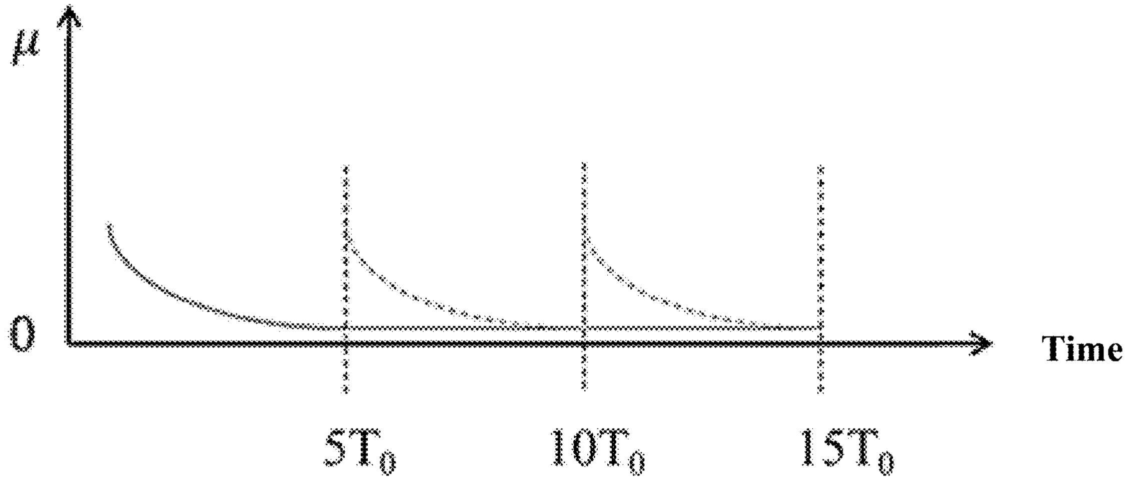
FIG. 6 illustrates a schematic diagram of a beamforming algorithm according to an embodiment of the present application.
Figure 6:
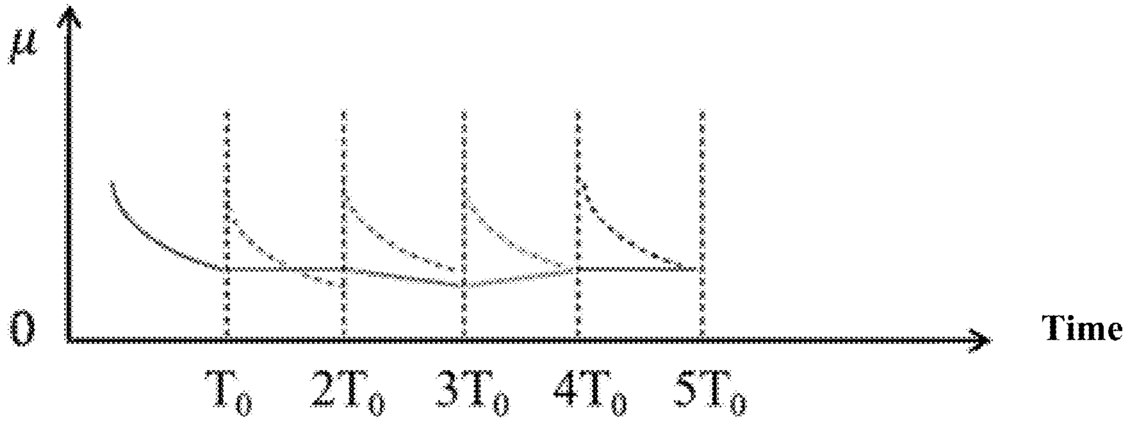

FIG. 6 illustrates a schematic diagram of a beamforming algorithm according to an embodiment of the present application. As shown in FIG. 6, an update interval T1=5T0 may be set for a low-frequency sound (e.g., a frequency less than 4000 Hz), and an update interval T2=T0 may be set for a high-frequency sounds (for example, a frequency greater than or equal to 4000 Hz). The update interval T1 for the low-frequency sound is greater than the update interval T2 for the high-frequency sound, such that the attenuation function μ(t) has a stronger suppression for the low-frequency sound. The reason for doing this is that the low-frequency sound has a better diffraction capability than the high-frequency sound, and a low-frequency sound from a sound source outside the target direction is easier to propagate to the microphones than the high-frequency sound. In addition, this configuration can also better suppress a low-frequency noise in non-target directions.

In other examples, a threshold for distinguishing the low-frequency sound from the high-frequency sound may also be other frequencies different from 4000 Hz, or may be customized thresholds configured according to, for example, different hearing aid wearers, so as to better adapt to the wearer's physiological characteristics. These customized thresholds can be determined by, for example, actual tests, or can also be determined by statistical data. In other examples, the low-frequency sound and the high-frequency sound can also be distinguished by other schemes, and a scheme for distinguishing them is not limited to dividing the audible frequency into two intervals. Accordingly, the number of the attenuation function is not limited to 2. For example, an audio may be divided into three intervals of a low-frequency sound (for example, a frequency less than 2000 Hz), a medium-frequency sound (for example, a frequency between 2000 Hz and 6000 Hz), and a high-frequency sound (for example, a frequency greater than or equal to 6000 Hz) using the thresholds of 2000 Hz and 6000 Hz. Further, different update intervals can be set for the audio in each interval. For example, an update interval T3=5T0 is set for the low-frequency sound, an update interval T4=3T0 is set for the intermediate frequency sound, and an update interval T5=T0 is set for the high frequency sound.

In some examples of the present application, a hearing aid is adapted to be worn in a human auricle, for example, one microphone in the hearing aid may be oriented toward the auricle, while another microphone in the hearing aid may be oriented away from the auricle.

Figure 4:
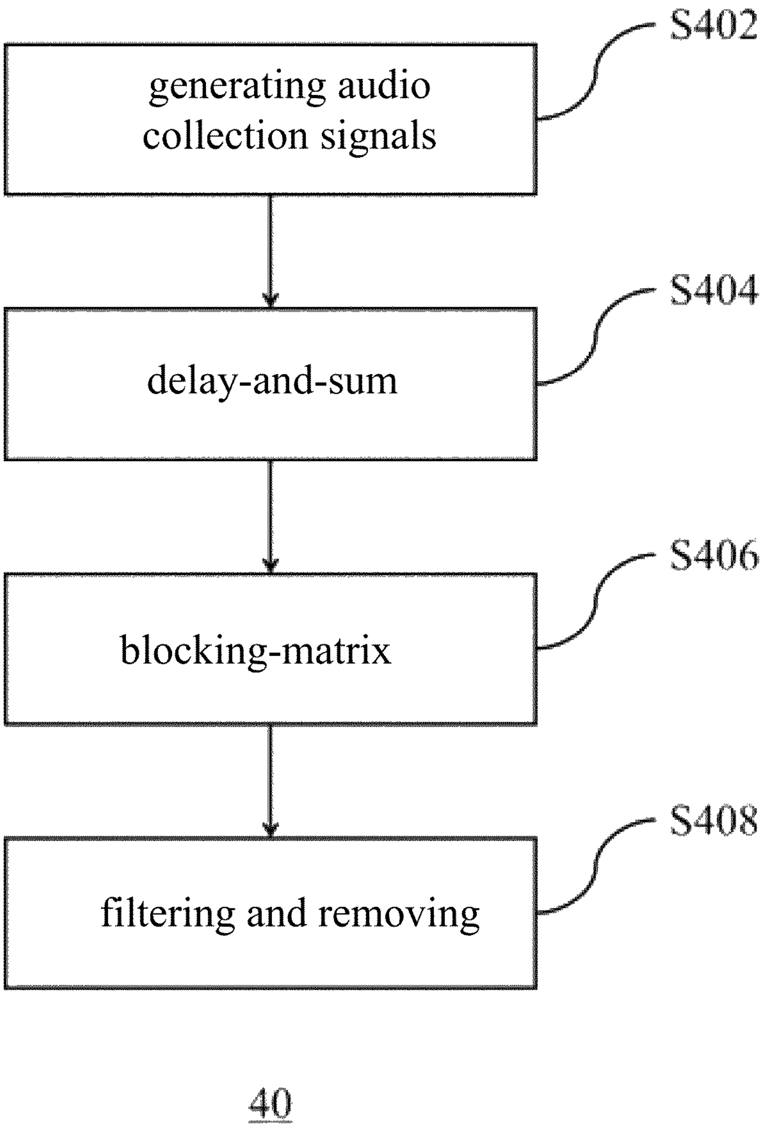
FIG. 4 illustrates an audio enhancement method according to an embodiment of the present application.

FIG. 4 illustrates an audio enhancement method 40 according to an embodiment of the present application, and the audio enhancement method 40 includes steps S402, S404, S406, and S408 as shown. It should be noted that although FIG. 4 illustrates a feasible sequence in the schematic order, the execution of the steps S402, S404, S406, and S408 is not limited thereto, and the steps S402, S404, S406, and S408 may also be executed in other feasible sequences. A working principles of the steps S402, S404, S406, and S408 of the audio enhancement method 40 in FIG. 4 will be described in the following, and the corresponding examples described above together with other figures are cited here and will not be elaborated here for brevity.

As shown in FIG. 4, the audio enhancement method 40 generates audio collection signals in the step S402. In some examples, as described above, a sound generated by the sound source 101 may be picked up by the microphone 102-1 and the microphone 102-2 of the hearing aid. The microphone 102-1 and the microphone 102-2 may be arranged on left and right sides of the wearer 103 of the hearing aid, and the distance between them may be a constant value d. For example, the distance d may depend on the distance between two ears of the wearer 103. The wearer 103 faces upward in FIG. 1 at an angle of 0° as shown. The sound source 101 is located in the left front of the wearer 103 and forms an angle θ with a midline of the visual field of the wearer 103. Since a distance between the sound source 101 and the wearer 103 (and his/her two ears) is much greater than the distance between the two ears, it can be considered that the sound source 101 is at the angle θ shown in the figure relative to the microphone 102-1 and the microphone 102-2. It can be seen from the geometric relationship that, assuming that a propagation speed of sound in the air is v and a signal received by the microphone 102-1 is $y_1(t)$, then a signal received by the microphone 102-2 is $y_2(t)=y_1(t-\tau)$, where t=(d*sin(θ))/v.

A short-time Fourier transform is performed on the signals received by the microphone 102-1 and the microphone 102-2 respectively, and it is assumed that a transformation result of $y_1(t)$ is $Y_1(k,l)$ and a transformation result of $y_2(t)$ is $Y_2(k,l)$, where k represents a frequency bin, and l represents a frame index. The generated audio collection signals $Y_1(k,l)$ and $Y_2(k,l)$ may satisfy the following equation:

$$Y_2(k, l) = Y_1(k, l) * e^{-j\omega\tau}.$$

The audio enhancement method 40 performs a delay-and-sum processing on the audio collection signals in step S404. Turing to FIG. 3, as described above, the delay beamformer 201 may receive and process the signals from the microphone 102-1 and the microphone 102-2. In some schemes, the signals $Y_{DSB}$ obtained after processing of the delay beamformer 201 may satisfy, for example, $$Y_{DSB} = \frac{1}{2}\big(Y_1(k, l) + \big(Y_2(k, l)e^{j\omega\tau}\big).$$

The audio enhancement method 40 performs a blocking-matrix processing on the audio collection signals in step S406. Continuing referring to FIG. 3, as described above, the blocking-matrix 202 may receive and process the signals from the microphone 102-1 and the microphone 102-2. In some schemes, the signal $Y_{BM}$ obtained after processing of the blocking-matrix 202 may satisfy, for example, $Y_{BM}=Y_1(k,l)-Y_2(k,l)e^{j\omega\tau}$.

The audio enhancement method 40 performs a filtering processing on the blocking-matrix signal $Y_{BM}(k,l)$ in step S408. Continuing referring to FIG. 3, as described above, the LMS filter 303 with adjustable parameters further processes $Y_{BM}$ and sends the processed result to the summing unit 204. The signal $Y_{GSC}(k,l)$ output from the summing unit 204 satisfies $$Y_{GSC}(k, l) = Y_{DSB}(k, l) - W^*_{ANC}(k, l)Y_{BM}(k, l),$$

where $W_{ANC}(k,l)$ is an iteration coefficient of the LMS filter 303, and*represents conjugation.

Furthermore, $W_{ANC}(k,l)$ satisfies a relationship defined by the following equations (5) and (6):

$$W_{ANC}(k, l+1) = W_{ANC}(k, l) + \mu(t) * \frac{Y_{BM}(k, l)Y^*_{GSC}(k, l)}{P_{est}(k, l)} \tag{5}$$

$$P_{est}(k, l) = \alpha P_{est}(k, l-1) + (1-\alpha)\big(|Y_{BM}(k, l)|^2 + |Y_{GSC}(k, l)|^2\big) \tag{6}$$

wherein the attenuation function μ(t) satisfies the relationship defined in equation (3). As described above, the delay unit 305 enables μ(t) to be updated at a predetermined update interval T, which will not be described in detail here.

Figure 7:
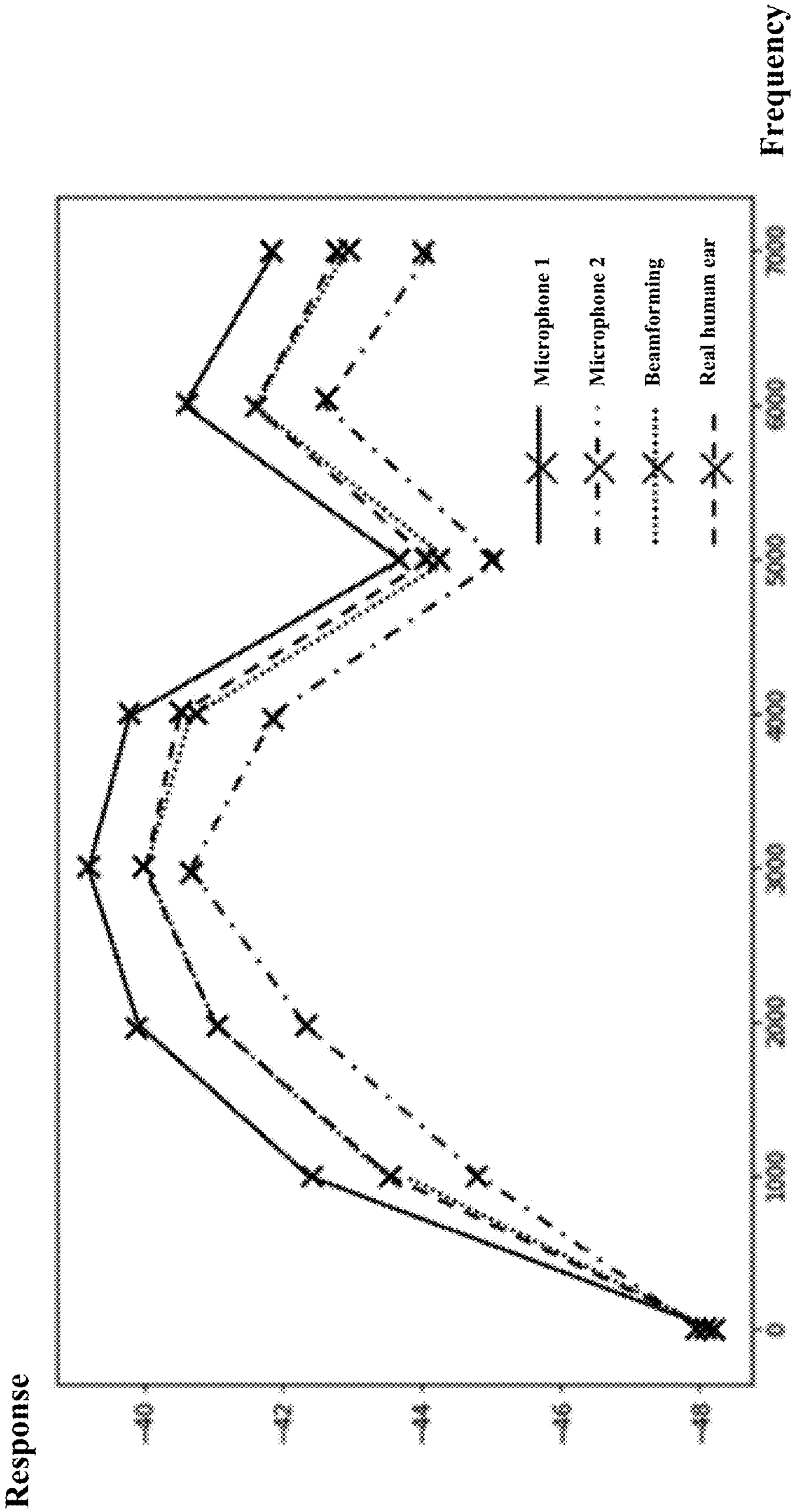
FIG. 7 is a schematic diagram illustrating an effect of a beamforming algorithm according to an embodiment of the present application.
Figure 8:
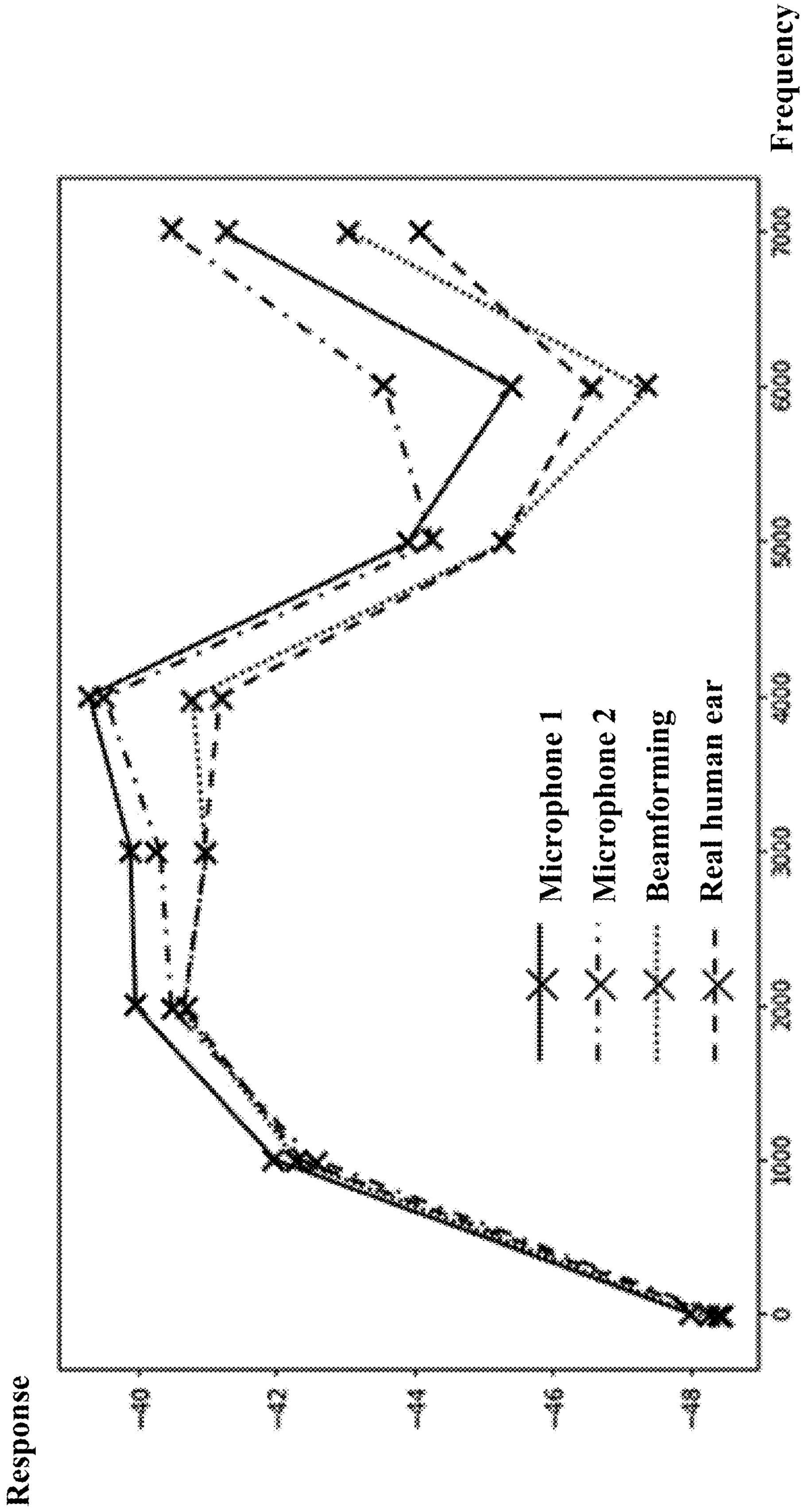
FIG. 8 is a schematic diagram illustrating an effect of a beamforming algorithm according to an embodiment of the present application.
Figure 9:
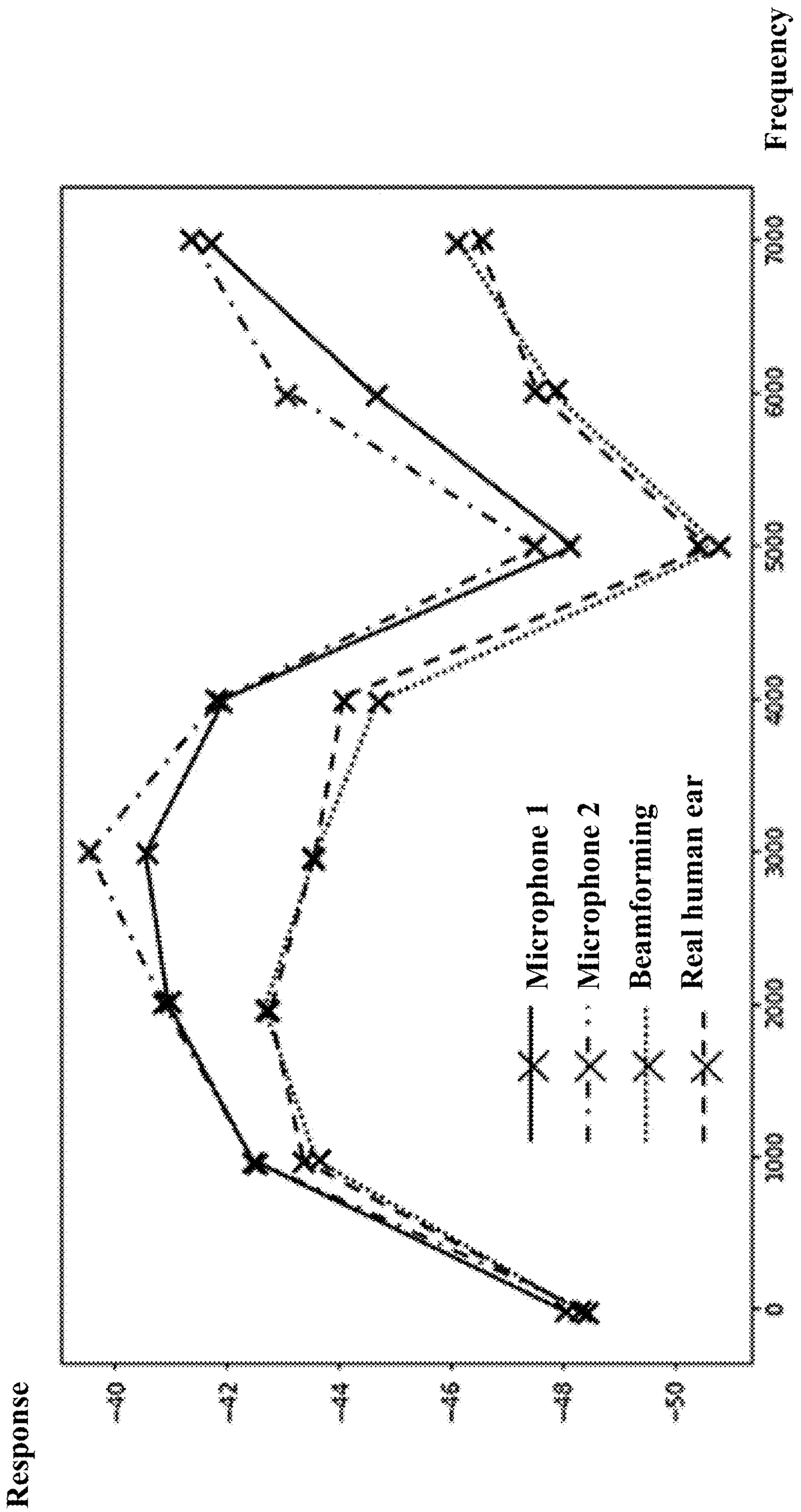
FIG. 9 is a schematic diagram illustrating an effect of a beamforming algorithm according to an embodiment of the present application.

FIG. 7, FIG. 8 and FIG. 9 illustrate testing effects of the beamforming algorithm according to some examples of the present application in three directions of 90°, 0° and −90° shown in FIG. 1, respectively. It can be seen from the figures that the beamforming algorithm according to some examples of the present application can obtain frequency response curves of the beamforming shown in the figures according to the frequency response curves of a microphone 1 and a microphone 2 in the microphone array, and the obtained frequency response curves are generally consistent with the frequency response curve of a real human ear. It can be seen from the simulation results that the frequency response curves obtained from the beamforming algorithm do not over-suppress a specific direction, such that the beamforming algorithm according to some examples of the present application has good adaptability to applications that need to simulate the response characteristics of the human ear. The beamforming algorithm according to some examples of the present application not only has a good suppression effect on noise, but also takes into account the response characteristics of the human ear, and, therefore, is particularly suitable for application scenarios such as hearing aids that require a true reflection of the physical world.

In another aspect of the present application, an audio enhancement apparatus is further provided, and the apparatus may include a non-transitory computer storage medium having one or more executable instructions stored therein, wherein when the one or more executable instructions are executed by a processor, any of the audio enhancement methods described above is performed. In some examples, the audio enhancement device may be a hearing aid device.

In another aspect of the present application, a non-transitory computer storage medium is provided, and the non-transitory computer storage medium has one or more executable instructions stored therein, wherein when the one or more executable instructions are executed by a processor, any of the audio enhancement methods described above is performed.

The embodiments of the present invention may be implemented by hardware, software, or a combination of software and hardware. The hardware part may be implemented by using dedicated logic, and the software part may be stored in a memory and can be executed by an appropriate instruction execution system such as a microprocessor or a dedicated design hardware. A person of ordinary skill in the art may understand that the foregoing apparatus and methods may be implemented by using computer-executable instructions and/or being included in processor control codes, and such codes may be provided by, for example, a carrier media such as a disk, a CD or a DVD-ROM, a programmable memory such as a read-only memory (firmware), or a data carrier such as an optical or electronic signal carrier. The apparatus and its modules of the present invention may be implemented by hardware circuits such as very large scale integration circuits or gate arrays, semiconductors such as logic chips or transistors, or programmable hardware devices such as field programmable gate arrays or programmable logic devices, or may be implemented by software executed by various types of processors, or may be implemented by a combination of the above-mentioned hardware circuits and software, such as firmware.

It should be noted that although several steps or modules of the audio enhancement method, apparatus, and storage medium have been mentioned in the above detailed description, such division is merely exemplary rather than mandatory. Actually, according to the embodiments of the present application, the features and functions of two or more modules described above may be embodied in one module. Conversely, the feature or function of one module described above may be further divided and embodied by a plurality of modules.

Those of ordinary skill in the art can understand and implement other changes to the disclosed embodiments by studying the description, the disclosed content, the drawings, and the appended claims. In the claims, the term "comprising" does not exclude other elements and steps, and the term "a" or "an" does not exclude a plurality. In an actual application of the present application, one component may perform functions of a plurality of technical features cited in the claims. Any reference signs in the claims should not be construed as limiting the scope.

The invention claimed is:

1. An audio enhancement method, comprising:

generating a group of audio collection signals using a microphone array, wherein each audio collection signal in the group of audio collection signals is generated by one microphone in the microphone array, and each microphone in the microphone array is spaced apart from others;

performing a delay-and-sum processing on the group of audio collection signals to generate a delay-and-sum signal $Y_{DSB}(k,l)$, wherein k represents a frequency bin and l represents a frame index;

performing a blocking-matrix processing on the group of audio collection signals to generate a blocking-matrix signal $Y_{BM}(k,l)$;

performing a filtering processing on the blocking-matrix signal $Y_{BM}(k,l)$ using an adaptive filtering matrix $W_{ANC}$, and removing the filtered blocking-matrix signal from the delay-and-sum signal $Y_{DSB}(k,l)$ to obtain an enhanced audio output signal $Y_{OUT}(k,l)$;

wherein the adaptive filtering matrix $W_{ANC}$ is a weight coefficient matrix which is based on at least one attenuation function $\mu(t)$ and varies with the audio output signal $Y_{OUT}(k,l)$ and the blocking-matrix signal $Y_{BM}(k,l)$, and each of the at least one attenuation function is updated at a corresponding predetermined update interval T.

2. The method of claim 1, wherein the microphone array comprises at least two microphones located on a same audio processing device.

3. The method of claim 2, wherein the audio processing device is adapted for being worn in a human auricle.

4. The method of claim 3, wherein one of the at least two microphones is oriented toward the auricle, and another of the at least two microphones is oriented away from the auricle.

5. The method of claim 1, wherein the audio output signal is determined by the following equation:

$$Y_{OUT}(k,l) = Y_{DSB}(k,l) - W_{ANC}^{*}(k,l)Y_{BM}(k,l)$$

and the adaptive filtering matrix $W_{ANC}$ is determined by the following equation:

$$W_{ANC}(k,l+1) = W_{ANC}(k,l) + \mu(t) * \frac{Y_{BM}(k,l)Y_{GSC}^{*}(k,l)}{P_{est}(k,l)}$$

wherein $P_{est}(k,l)$ is determined by the following equation:

$$P_{est}(k,l) = \alpha P_{est}(k,l-1) + (1-\alpha)\sum_{m=1}^{M-1}\left|Y_{BM_m}(k,l)\right|^2$$

wherein α is a forgetting factor, and M is a number of the microphones in the microphone array.

6. The method of claim 1, wherein the at least one attenuation function comprises a first attenuation function and a second attenuation function, the first attenuation function is updated at a first predetermined update interval, and the second attenuation function is updated at a second predetermined update interval; wherein the first attenuation function corresponds to a high-frequency signal higher than or equal to a predetermined frequency threshold, and the second attenuation function corresponds to a low-frequency signal lower than the predetermined frequency threshold, and the first predetermined update interval is shorter than the second predetermined update interval.

7. The method of claim 1, wherein each of the at least one attenuation function $\mu(t)$ is updated in a current update interval based on its value in a first update interval.

8. The method of claim 7, wherein each point of each of the at least one attenuation function $\mu(t)$ in the current update interval $\mu(t)$ is updated by assigning a change weight between 0 and 1 based on a value of its corresponding point in the first update interval.

9. The method of claim 8, wherein the weight is a linear function of time within the current update interval.

10. The method of claim 9, wherein the weight is an increasing linear function of time within the current update interval.

11. The method of claim 8, wherein the weight is a nonlinear function of time within the current update interval.

12. The method of claim 9 or claim 10, wherein each of the at least one attenuation functions μ(t) is updated in the current update interval further based on its value at the end of a previous update interval.

13. The method of claim 12, wherein each of the at least one attenuation function μ(t) satisfies the following equation within the current update interval (NT, (N+1) T]:

$$\mu(t) = \mu(N*T) + \left(\frac{t}{T} - N\right) * \mu(t - N*T),\ N*T < t \leq (N+1)*T;$$

wherein N is a positive integer.

14. An audio enhancement apparatus, the apparatus comprising a non-transitory computer storage medium having stored therein one or more executable instructions that, when executed by a processor, perform the following steps:

generating a group of audio collection signals using a microphone array, wherein each audio collection signal in the group of audio collection signals is generated by one microphone in the microphone array, and each microphone in the microphone array is spaced apart from others;

performing a delay-and-sum processing on the group of audio collection signals to generate a delay-and-sum signal $Y_{DSB}(k,l)$, wherein k represents a frequency bin and l represents a frame index;

performing a blocking-matrix processing on the group of audio collection signals to generate a blocking-matrix signal $Y_{BM}(k,l)$;

performing a filtering processing on the blocking-matrix signal $Y_{BM}(k,l)$ using an adaptive filtering matrix $W_{ANC}$, and removing the filtered blocking-matrix signal from the delay-and-sum signal $Y_{DSB}(k,l)$ to obtain an enhanced audio output signal $Y_{OUT}(k,l)$;

wherein the adaptive filtering matrix $W_{ANC}$ is a weight coefficient matrix which is based on at least one attenuation function μ(t) and varies with the audio output signal $Y_{OUT}(k,l)$ and the blocking-matrix signal $Y_{BM}(k,l)$, and each of the at least one attenuation function is updated at a corresponding predetermined update interval T.

15. The apparatus of claim 14, wherein the apparatus is a hearing aid.

16. A non-transitory computer storage medium having stored therein one or more executable instructions that, when executed by a processor, perform an audio enhancement method comprising:

generating a group of audio collection signals using a microphone array, wherein each audio collection signal in the group of audio collection signals is generated by one microphone in the microphone array, and each microphone in the microphone array is spaced apart from others;

performing a delay-and-sum processing on the group of audio collection signals to generate a delay-and-sum signal $Y_{DSB}(k,l)$, wherein k represents a frequency bin and l represents a frame index;

performing a blocking-matrix processing on the group of audio collection signals to generate a blocking-matrix signal $Y_{BM}(k,l)$;

performing a filtering processing on the blocking-matrix signal $Y_{BM}(k,l)$ using an adaptive filtering matrix $W_{ANC}$, and removing the filtered blocking-matrix signal from the delay-and-sum signal $Y_{DSB}(k,l)$ to obtain an enhanced audio output signal $Y_{OUT}(k,l)$;

wherein the adaptive filtering matrix W ANC is a weight coefficient matrix which is based on at least one attenuation function μ(t) and varies with the audio output signal $Y_{OUT}(k,l)$ and the blocking-matrix signal $Y_{BM}(k,l)$, and each of the at least one attenuation function is updated at a corresponding predetermined update interval T.

* * * * *